United States Patent [19]
House

[11] Patent Number: 5,213,026
[45] Date of Patent: May 25, 1993

[54] COMMODITY DEHYDRATING STABILIZER

[75] Inventor: J. Edward House, Spring Branch, Tex.

[73] Assignee: The NeVentures Foundation, Denver, Colo.

[21] Appl. No.: 751,168

[22] Filed: Aug. 28, 1991

[51] Int. Cl.[5] ............ A23K 1/14; A23K 3/00; A23L 1/20
[52] U.S. Cl. .................. 99/326; 99/348; 99/353; 99/483; 99/488; 99/524; 366/81; 366/319
[58] Field of Search ............... 99/349, 483, 352–355, 99/329 R, 488, 443 C, 516, 524, 534, 536, 325, 326; 366/79, 81, 90, 142, 318, 319, 324, 192, 601; 426/516, 523; 425/207–209; 100/117, 145; 49/362; 403/335, 336

[56] References Cited

U.S. PATENT DOCUMENTS

| | | |
|---|---|---|
| 2,667,963 | 2/1954 | Rittinger . |
| 2,767,963 | 10/1956 | Ringen et al. .................. 366/133 |
| 3,685,429 | 8/1972 | McBride . |
| 3,685,430 | 8/1972 | McBride . |
| 3,687,423 | 8/1972 | Koch et al. . |
| 3,695,891 | 10/1972 | Fox . |
| 3,765,319 | 10/1973 | Fox . |
| 3,924,839 | 12/1975 | Millauer . |
| 4,092,015 | 5/1978 | Koch . |
| 4,107,788 | 8/1978 | Anders . |
| 4,462,693 | 7/1984 | Buschoom . |
| 4,465,475 | 8/1984 | Mordorf et al. . |
| 4,741,264 | 5/1988 | McPeak . |

Primary Examiner—Timothy F. Simone
Attorney, Agent, or Firm—Browning, Bushman, Anderson & Brookhart

[57] ABSTRACT

An apparatus and system is disclosed for extruding commodities such as rice bran and which includes symmetrically disposed beater bar segments on the extruder rotor that will simultaneously impact symmetrically positioned knives mounted within the extruder housing. The apparatus preferably includes a sufficient number of knives and beater bars that impacts occur more than once each ninety degrees of rotation and at substantially equal degrees of rotation from each other. The device includes a widened and lengthened extrusion gap with variable width, a generally solid extrusion rotor, and a control system for adjusting the cooking temperature by varying the width of the extrusion gap. The extruder is fed using a drag conveyor with angled blades which push the rice bran into the extruder housing.

27 Claims, 4 Drawing Sheets

COMMODITY DEHYDRATING STABILIZER

BACKGROUND OF THE INVENTION

1. Field of the Invention

The present invention relates generally to extrusion processing and, more particularly, to an extrusion apparatus for processing rice bran.

2. Description of the Background

In recent years published medical studies have shown strong links between heart trouble and high cholesterol levels. As a result, consumers have become much more interested in products, especially natural products, which have beneficial effects on cholesterol levels. Rice bran is a low fat product that has been shown to have a favorable effect on cholesterol levels. Consequently there has been an increased demand for rice bran and particularly for rice bran breakfast cereals. Furthermore, there are indications that rice bran oil, which may be used for cooking oil, has the unique ability, under certain conditions, to lower harmful cholesterol levels up to 30 percent without reducing the amount of so-called good cholesterol that protects against heart attacks. Tests with animals show rice bran oil can even raise the good cholesterol levels in some cases.

Although rice is abundantly grown throughout the world, only a small percentage of the rice bran contained within the raw rice has, in the past, been used for human consumption. The fact is that one of the most nutritious foods known to man, rice bran, becomes rancid within a few hours after the milling process, making it substantially inedible by humans after that time and, after several days, digestible only by animals. If the rice bran is to be saved, it must be stabilized almost immediately after milling.

One method of stabilizing the rice bran involves processing it within an extrusion cooker. A rice bran extrusion cooker, which has been used to process the rice bran, is described and illustrated in U.S. Pat. No. 4,741,264 to D. L. McPeak, incorporated herein by reference. By processing the rice bran in the McPeak apparatus, for typically less than one second, the rice bran will often experience a ten fold increase in value due to the fact that it can now be used for human as well as animal consumption. The McPeak apparatus has been used in stabilizing the rice bran so that time is available to extract the rice bran oil and also to utilize the remaining defatted rice bran as high protein, low fat food for human consumption.

However, the McPeak apparatus has a number of serious drawbacks. For instance, the McPeak machines often experience an inordinate amount of vibration during operation. In some cases, the vibration is so severe that even providing a suitable mounting for the machine becomes troublesome. The vibration produces wear in the machine due to increased mechanical strain. Also the vibration indicates inefficiency in that the energy spent on vibration is not being used for processing the rice.

Linked to the vibration problem is a rice bran extruder flow problem in that the rice bran is often extruded from the McPeak apparatus in a turbulent or pulsating flow rather than a smooth flow. A turbulent or pulsating output may result in less consistent cooking of the rice bran and therefore lower quality and a generally short shelf life of the processed rice bran.

Another significant problem which can occur in the McPeak machine concerns difficulty in maintaining a steady temperature on the output. The United States Department of Agriculture generally sets a temperature range within which the cooking temperature must remain. A typical range might be 130 degrees Centigrade plus or minus 4 degrees. The McPeak machine has a hand crank to adjust the extrusion gap and thereby vary the cooking temperature. In some instances, however, it has been observed that a very small change in the extrusion gap quickly results in up to a 10 degree Centigrade temperature change, thus making adjustment of the cooking temperature difficult. The instability of the output temperature is such that it is perplexing, if not impossible, to design an automatic control system adapted to the machine that will control the temperature adequately. This problem also results in a processed bran output that is not always of the best quality due to inconsistent cooking.

Power outages can create difficult problems for a rice bran extrusion machine. If the power to the machine should become cut off, within a short time the liquified bran remaining in the extrusion housing begins to solidify. Even after a short period the extrusion shaft may be effectively glued into the extrusion housing. If the bran solution is allowed to cool inside the housing, a large force, in some cases over twenty tons, may be required for disassembly. An operator may not always be immediately available in time to prevent this problem due to the fact that sometimes these machines run for days at a time making constant observation difficult.

Another problem, which the McPeak patent specification addresses, in column 4, is the problem of providing the extrusion device with a continuous feed of rice bran. Rice bran, due to its oil content, has a tendency to bridge or stick rather than flow freely into the extruder housing. The McPeak machine utilizes a hopper to gravity feed the rice bran into a feed conveyor. However, a gravity feeding hopper is, itself, subject to bridging or sticking of the bran.

A further wear related complication with the McPeak machine is that even though most wear occurs near the output end of the extrusion rotor, the entire rotor, including sections of the rotor without appreciable wear, must be replaced when the output end of the rotor requires replacement.

In summary, the McPeak machine is generally subject to problems of excessive vibration, unstable cooking temperature, reduced efficiency and uncertain reliability.

Consequently, there has been a long felt but unfulfilled need in the rice bran processing industry for an improved apparatus utilizing improvements in extrusion processing techniques for rice bran. The industry has long sought improved rice bran processing apparatus and methods which will result in greater reliability and dependability of operation at reduced levels of capital investment and energy consumption.

SUMMARY OF THE INVENTION

The present invention provides a unique design for beater bars on the extrusion rotor to greatly reduce vibration and wear problems. Additional features which improve the consistency of the output bran include a substantially solid metal extrusion rotor, a lengthened, variable width extrusion gap, a computerized control system and a unique drag conveyor belt for feeding rice bran into the extrusion housing.

The applicant has determined that the vibration problem in previous rice bran extruders arises, for the most part, due to asymmetrical and substantially non-continuous impacting between the beater bars and the knives located in the extruder housing. The present invention provides parameters for this relationship which not only reduce vibration but also produce a generally steady flow of rice bran through the extrusion cooker rather than a turbulent or pulsing flow. Thus the rice bran is cooked more evenly and more consistently to yield an improved quality product. The beater bar segments, in a preferred embodiment of the present invention, substantially simultaneously impact the knives in the extruder housing. Also, in this preferred embodiment, these impacts occur during rotor rotation at substantially equal degrees of rotation from each other. Experimentation has established that these impacts should occur more often than once each ninety degrees of rotation.

Another feature of the present invention is a rotor with a replaceable beater bar section. The portion of the rotor in which the most wear occurs, i.e., that part which contains the beater bars, is made separately replaceable in a preferred embodiment of the present invention. Therefore the longer wearing part of the rotor may continue to be used with a new beater bar portion to thereby reduce costs. Also, in a preferred embodiment, the beater bar portion of the rotor is made of hardened steel or carbon steel to increase its service time before replacement. In other words, this section is made especially resistent to wear by treating the metal in some way well known in the field of metallurgy. Due to the extra cost of this treatment, it need not be provided to other parts of the extruder to save manufacturing costs. Applicant also anticipates that other wear resistent materials besides metal may be discovered in the future and could be used in making the beater bar section.

Another feature of the present invention is a lengthened extrusion gap with variable width. By lengthening the extrusion gap, adequate pressure is maintained to extrusion cook the bran while permitting a wider path through the gap for greater rice bran flow. This feature also generally permits more accurate temperature control since a given change in the extrusion gap does not result in the drastic cooking temperature changes which occurred in earlier machines. The wider extrusion gap and redesigned beater bars of the present invention appear, at least in some test cases, to increase output from an earlier machine as much as about 40 percent. For example, a typical output of an earlier machine averaging 1400 lbs. of processed bran per hour may be increased to approximately 2000 lbs. per hour while using substantially the same energy. This increase in output is generally coupled with an increase in the output quality of the rice bran due to more consistent cooking of the rice bran. More consistent product cooking appears to extend the shelf life of the processed bran to more than one year and perhaps considerably longer.

Another feature of the present invention is a generally solid metal rotor to provide a heat sink to smooth out the rapid temperature fluctuations which occurred in earlier machines. This feature increases the time required for the machine to reach the proper cooking temperature by several minutes but, by acting to stabilize the cooking temperature, the output quality of the processed bran is improved. Due to the fact that rice bran extruders often run for several days in a row, the few minutes lost at the start up period is insignificant compared to the improved quality product.

Incorporation of the above mentioned features permits development of a computer control system to more accurately maintain the cooking temperature. A computer controlled system incorporating these features produces an improved, more consistent, rice bran output while requiring less attention by a human operator.

Still another feature of the present invention is a drag conveyor for feeding the bran into the extruder housing. This conveyor includes blades which are angled so that they not only push the bran along the belt but also positively force the bran off of the conveyor to force the bran into the extruder housing rather than relying on mere gravity feeding.

The present invention provides a smoother operating rice bran extruder having a continuous rather than pulsating or turbulent bran output flow by providing a unique design for the beater bar segments. The present invention increases the throughput of the rice bran extruder by redesigning the beater bars to more efficiently use energy and by providing a longer extrusion gap of variable width. The present invention provides a beater bar portion of the extrusion rotor which is replaceable, thereby lowering repair costs in the most wear prone part of the extruder apparatus. The present invention provides a solid metal rotor to decrease fluctuations in cooking temperatures, creating a more consistent, higher quality, product. In summary, the vibration problems of the McPeak rice bran extruder have been significantly reduced. The throughput of the rice bran extruder has been increased, in some cases, by up to approximately 40 percent while keeping the power requirements the same. Repair costs have been lowered on certain components of the apparatus. Output quality and consistency have generally been significantly improved. Accordingly, the present invention provides the improved apparatus and methods for processing rice bran which have been long sought by the industry. These and other meritorious features and advantages of the present invention will be more fully appreciated from the following description and claims.

BRIEF DESCRIPTION OF THE DRAWINGS

Other features and intended advantages of the present invention will be more readily apparent by the references to the following detailed description in connection with the accompanying drawings.

While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

BRIEF DESCRIPTION OF PREFERRED EMBODIMENTS

Figure 1:
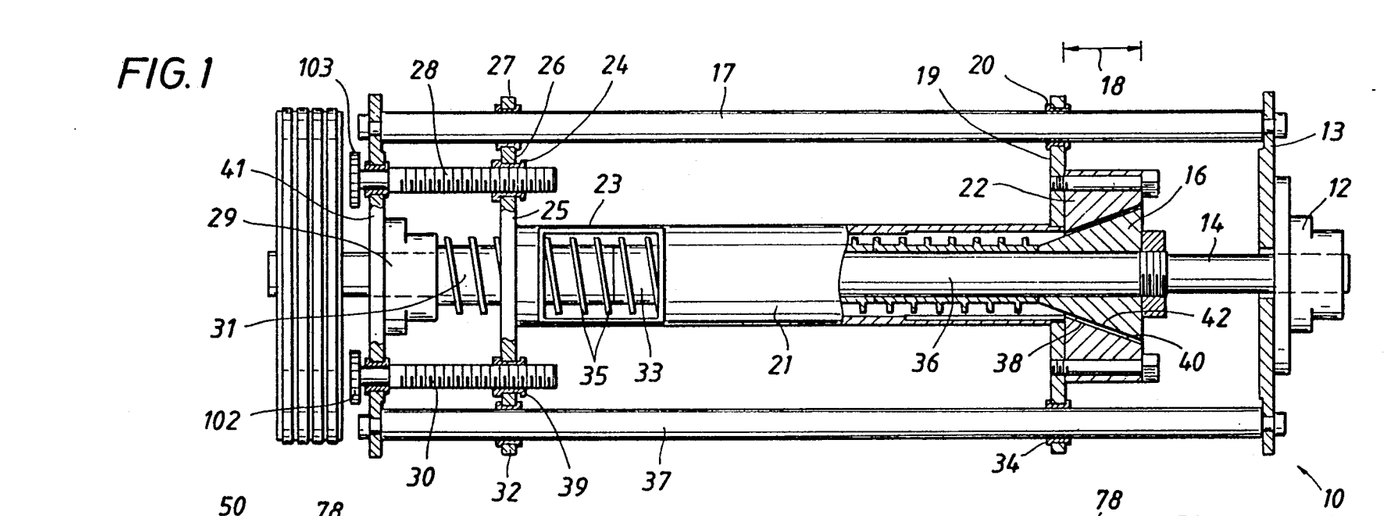
FIG. 1 is an upper elevational view, partially in section, showing a rice bran extruder in accordance with the present invention.
Figure 2:
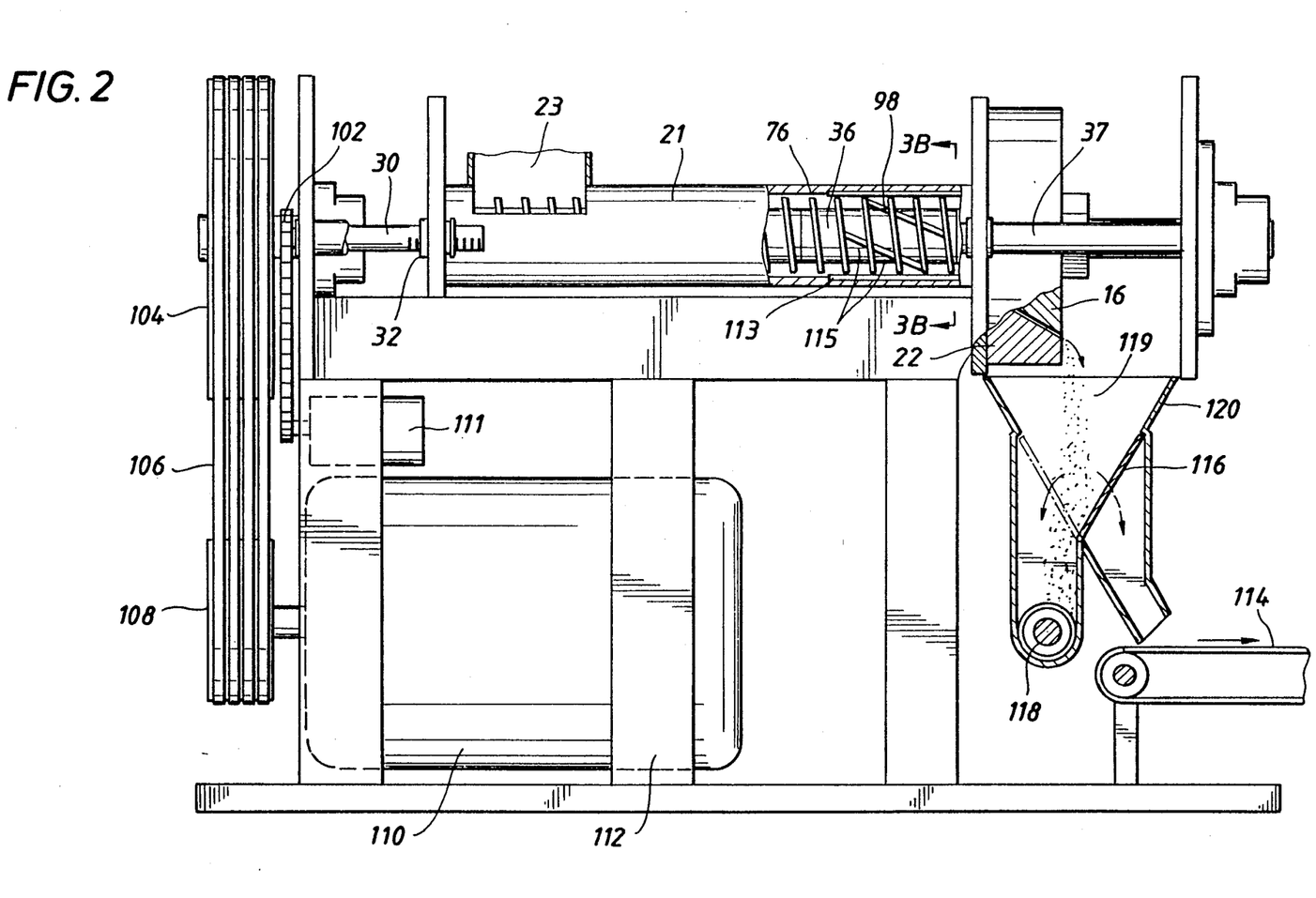
FIG. 2 is a side elevational view, partially in section, showing the rice bran extruder of FIG. 1.

Referring now to the drawings, and more particularly, to FIG. 1, a rice bran extruder, generally designated 10, according to a preferred embodiment of the present invention is shown. Rice bran extruder 10 includes a rice bran extruder housing 21 and extrusion rotor 31. Housing 21 is affixed to movable housing plates 19 and 25. Housing plates 19 and 25 are movable axially with respect to rotor 31 along rods 17 and 37 by means of bushings 20, 27, 32, and 34. By axial movement, the width of extrusion gap 40 is altered, thus changing the cooking temperature of the extruded rice bran 119 (FIG. 2). Housing plate 25 is moved axially when shafts 28 and 30 are rotated. Traveling nut couplings 24 and 39 are rotatably fixed in housing plate 25 and have internal threads (not shown) so that housing 21 moves axially in response to rotation of shafts 28 and 30. In the preferred embodiment, traveling nut couplings 24 and 39 are in the form of lost motion couplings as described in U.S. Pat. No. 4,229,907 to Hall, incorporated herein by reference. As explained and illustrated in detail in Hall, gap 26, within nut coupling 24, permits control motor 111 (FIG. 2) to generate significant momentum before applying driving force to housing plate 25. This feature can become very important if a power outage occurs. The rice bran tends to set up very quickly after rotation of rotor 31 stops. By applying a backup power supply voltage to motor 111, a significant jarring force can be applied to housing plate 25 to jar open the extruder housing 21 in the event housing 21 is sticking to rotor 31.

Extrusion rotor 31 is generally surrounded by spiral flutes 35 which are used to push the rice bran through housing 21. In the preferred embodiment shaft 14 extends through the center of rotor 31 (FIG. 3) and is rotatably fixed to rotor 31 by means of key 58. Shaft 31 is secured to outer plates 13 and 41 by bearings 12 and 29 so that rotor 31 is concentrically aligned with housing 21. This method of mounting rotor 31 also provides an improvement over prior rice bran extruders since bearing 12 is external to housing 21 and therefore no bearing for rotor 31 is necessary internal to housing 21 where little room is available. Also having bearing 12 some distance from extrusion gap 40, in which the extrusion pressure occurs, provides leverage in holding extrusion rotor 31 concentric despite possible variations in extrusion pressure which would tend to cause vibrations and further alter the width of gap 40 and cause temperature control problems.

In the preferred embodiment, rotor 31 has three main sections. The first section includes frustoconical shaped inner cone 16 which has surface 42 that forms the inner surface of extrusion gap 40. The second section includes beater bar section 36 which, in the preferred embodiment is separable from both inner cone 16 and the main portion of rotor 31. Beater bars 98 (FIG. 2) comprised of a plurality of beater bar segments 115 (FIG. 2) which are each interposed between fluting 35 are included in beater bar section 36. Beater bar section 36 receives most of the wear during the extrusion process. For this reason, beater bar section 36 is made detachable from the remainder of rotor 31 so that it can be replaceable. In the preferred embodiment beater bar section 36 is made of steel or other suitable material which is hardened against wear. The third section of extrusion rotor 31 includes the remainder of the rotor 31 running to bearing 29. In the preferred embodiment, inner cone 16 and beater bar section 36 are generally solid metal when seen as including shaft 14. In this way, rotor 31 has enough mass to act as a heat regulator to smooth out cooking temperature variations that may occur when the width of extrusion gap 40 is varied. Inner cone 16 and beater bar section 36 may be constructed of other materials which are both wear resistant and capable of functioning as a heat sink.

Outer cone 22, fixed to housing plate 19, has surfaces 38 which, together with surfaces 42 of cone 16, delineate extrusion gap 40. In the preferred embodiment, the axial length 18 of the extrusion gap has been increased from that found in prior art rice bran extruders. In prior extruders, axial length 18 was approximately 1 inch; in the presently preferred embodiment, axial length 18 is approximately 1.93 inches. Generally a length over approximately 1.5 inches provides a significant improvement over prior devices for several reasons. Due to the extra length of extrusion gap 40, it is now possible to enlarge its width, thus allowing a greater flow of processed rice bran 119 while retaining enough pressure to satisfactorily extrusion cook the rice bran 119. The wider extrusion gap 40, coupled with other improvements to be discussed hereinafter, promotes a smoother flow of rice bran 119 which means that the rice bran 119 will be more uniformly cooked and therefore be of higher quality. Furthermore, since extrusion gap 40 is generally wider, variations in gap size result in smaller temperature fluctuations than occurred in prior rice bran extruders which allows more precise control over the cooking temperature.

FIG. 2 shows a side view of rice bran extruder 10. In a preferred embodiment, motor 110 rotates drive pulley 108 which is coupled by V-belts 106 to pulley 104. Control motor 111 drives sprockets 102 and 103 to rotate threaded shafts 28 and 30 and thereby control the width of extrusion gap 40. Rice bran enters extrusion housing 21 at opening 23 and leaves through extrusion gap 40. Generally a shroud (not shown) forces the rice bran 119 into valve housing 120.

Figure 4:
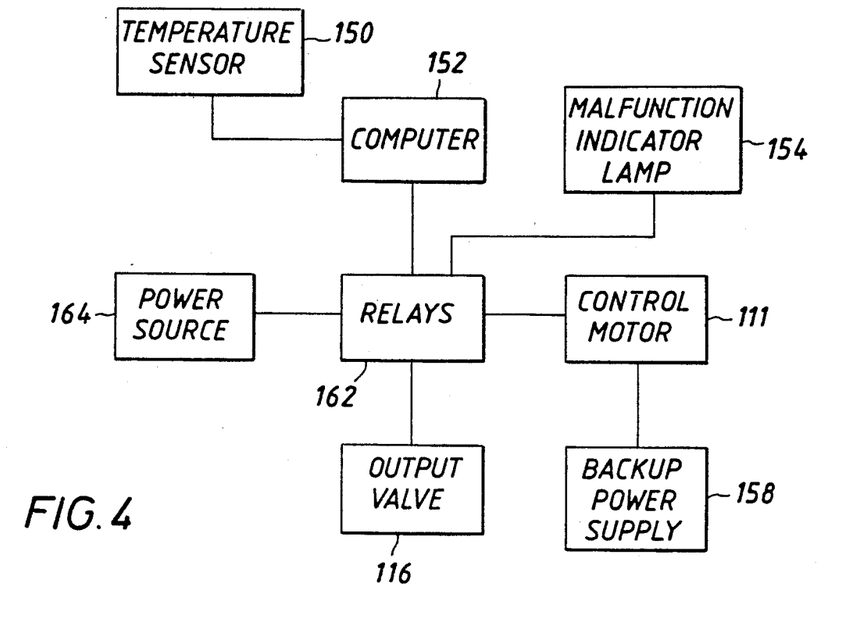
FIG. 4 is a block diagram schematic of a control system for a rice bran extrusion apparatus in accordance with the present invention.

Automated control is illustrated schematically in FIG. 4. In a preferred embodiment, computer 152, using temperature sensor 150, determines whether rice bran 119 has been cooked within the proper range of temperature as set by the FDA. Computer 152 then controls the opening of valve flap 116. If cooked properly, the rice bran 119 proceeds to packaging along belt conveyor 114. If the rice bran 119 has not been cooked properly, it proceeds down screw conveyor 118 to the scrap heap where it is mixed with animal feed.

Figure 3A:
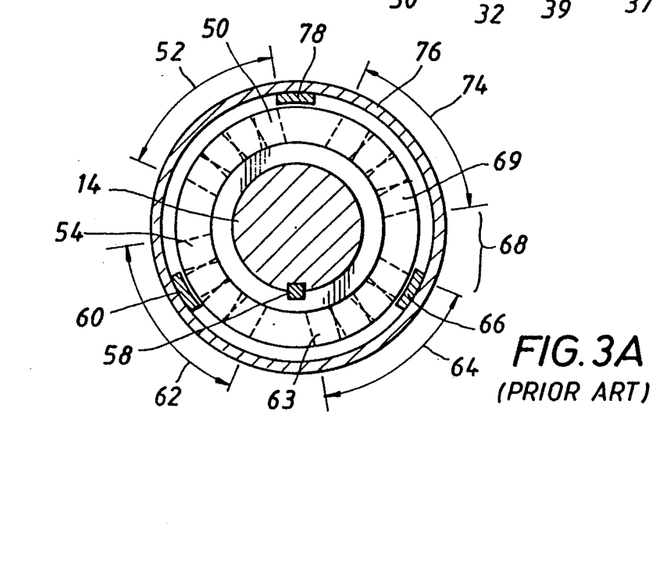
FIG. 3A is a front elevational view, partially in section, with the beater bars being in phantom and showing irregularities in the relationship of the beater bars and the knives which may occur in a prior art extruder.
Figure 3B:
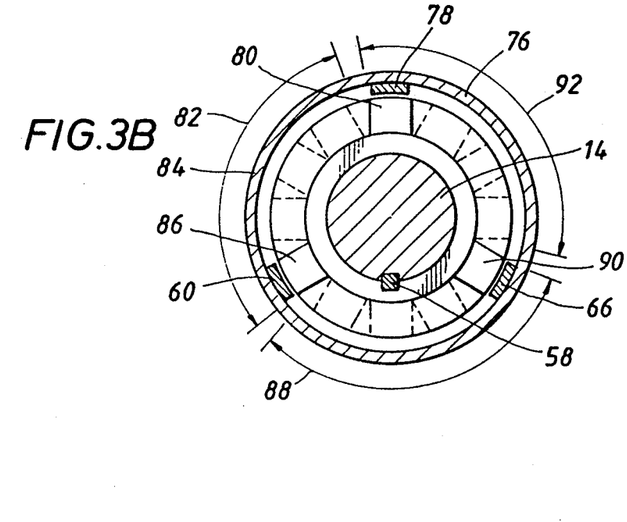
FIG. 3B is a front elevation view, partially in section, along the line of 3B—3B of FIG. 2, showing a preferred embodiment in accordance with the present invention with the beater bars being in phantom and revealing the relationship of the beater bars and the knives.

FIGS. 3A and 3B show beater bar segments 115 (side view in FIG. 2) in a phantom view from section lines 3B of FIG. 2 wherein flutes 35 are invisible. FIG. 3A shows the beater bar segments 115 in an exemplary distribution used with prior extruders. Stationary knives 78, 60, and 66 are mounted upon extrusion housing inner surface 76. Stationary knife 113 is seen from the side in FIG. 2 near the end of housing 21 adjacent extrusion gap 40. In FIG. 3A, four beater bars 98 (side view FIG. 2) are shown and each takes up a circumferential surface area as indicated by arcs 52, 74, 64, and 62. This arrangement leaves gaps such as gap 68. Due to this lack of continuity, drive motor 110 will attempt to speed up during gap 68 resulting in unwanted vibration.

FIG. 3B shows a preferred embodiment of the present invention wherein the beater bar segments 115 are spread to produce very few and much smaller gaps which results in a general reduction in vibration. Of course, it is possible to widen the beater bars 98 so that all gaps are removed. Generally, the spacing between impacts should be equal so that impacts occur at substantially equal degrees of rotation of rotor 31 from each other.

FIG. 3A shows that four beater bar segments 50, 69, 63, and 54 will strike three knives 78, 66, and 60 at different times during the rotation of extrusion rotor 31. Comparatively, in FIG. 3B, the three beater bars 93 are used to correspond to three stationary knives 78, 66, and 60. Beater bar segments 80, 90, and 86 form a set of segments, generally equidistantly spaced so that stationary knives 78, 66, and 60, which are also generally equidistantly spaced, will be substantially simultaneously impacted. The other beater bar segments 115 are similarly spaced and are most clearly seen as being arranged in sets. In this way the impacting forces are spread around the housing equally to help further reduce vibration as each set of beater bar segments 115 strikes a corresponding knife. When reducing the number of beater bar segments 115 to a minimum, tests indicate that more than four generally simultaneous sets of impacts should occur per revolution. Generally, increasing the number of beater bar segments 115 increases the necessary horsepower required to operate the rice bran extruder 10. A suitable balance is achieved in the present invention with three beater bars 98 (FIG. 2) having four beater bar segments 115 each and using three knives 113 (FIG. 2) in extruder housing 21.

FIG. 4 shows a preferred embodiment control system. This system can operate one or more rice bran extruders 10 with proper additional connections. The input from at least one temperature sensor 150 is transmitted to computer 152 which determines whether the rice bran was cooked at the correct temperature. Output valve 116 is controlled responsive to that determination through relays 162. If the temperature stays out of range for too long a time, a malfunction is indicated and the computer causes control motor 111 to fully open the housing. An indicator, e.g., a malfunction indicator lamp 154 or alarm (not illustrated), may also be activated and the power to rotor 31 shut off. Computer 152 acts through relays 162 to control the various functions. The cooking temperature is adjusted via control motor 111 by adjusting extrusion gap 40 according to input to computer 152 from temperature sensor 150. Of course, additional functions, including control of power to drive motor 110, may be included to allow a shut down, if necessary, based on a vibration sensor or other heat sensor readings. Backup power supply 158 operates to open up extrusion housing 21 in case of a power failure to avoid letting the rice bran set up within the housing 21 which could cause rotor 31 to become virtually cemented into housing 21.

Figure 5:
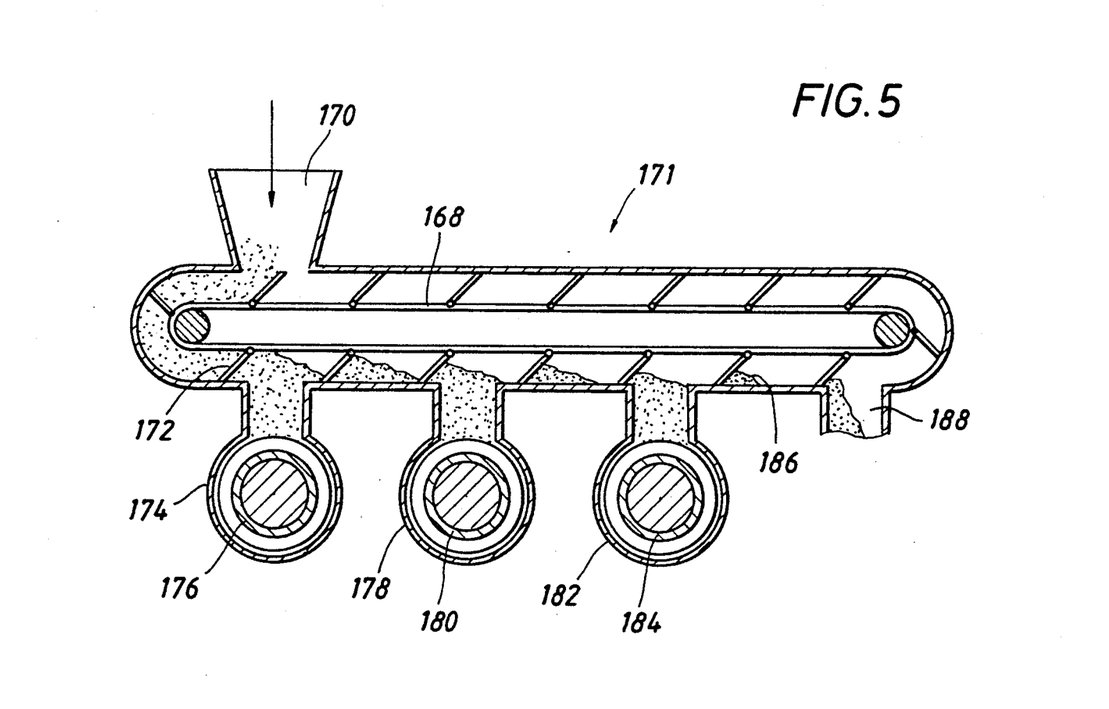
FIG. 5 is a side elevational view of a drag conveyor in accord with the present invention.

FIG. 5 illustrates input drag conveyor 171 for introducing rice bran into extrusion housings 174, 178, and 182 which include rotors 176, 180, and 184. Blades 172 push rice bran through the conveyor on chain 168 after introduction into opening 170. Blades 172 are slanted away from the direction of movement of chain 168. This feature causes the blades to impart a downward force, as viewed in FIG. 5, to the rice bran to aid in forcing it into the rice bran extruder housings. Due to the stickiness of rice bran 119, gravity is not always adequate to move the rice bran 119. The same general concept of slanted blades can be used to force the rice bran into opening 170. Unused rice bran 186 will go to the scrap heap via opening 188 to be used with animal feed.

Figure 6:
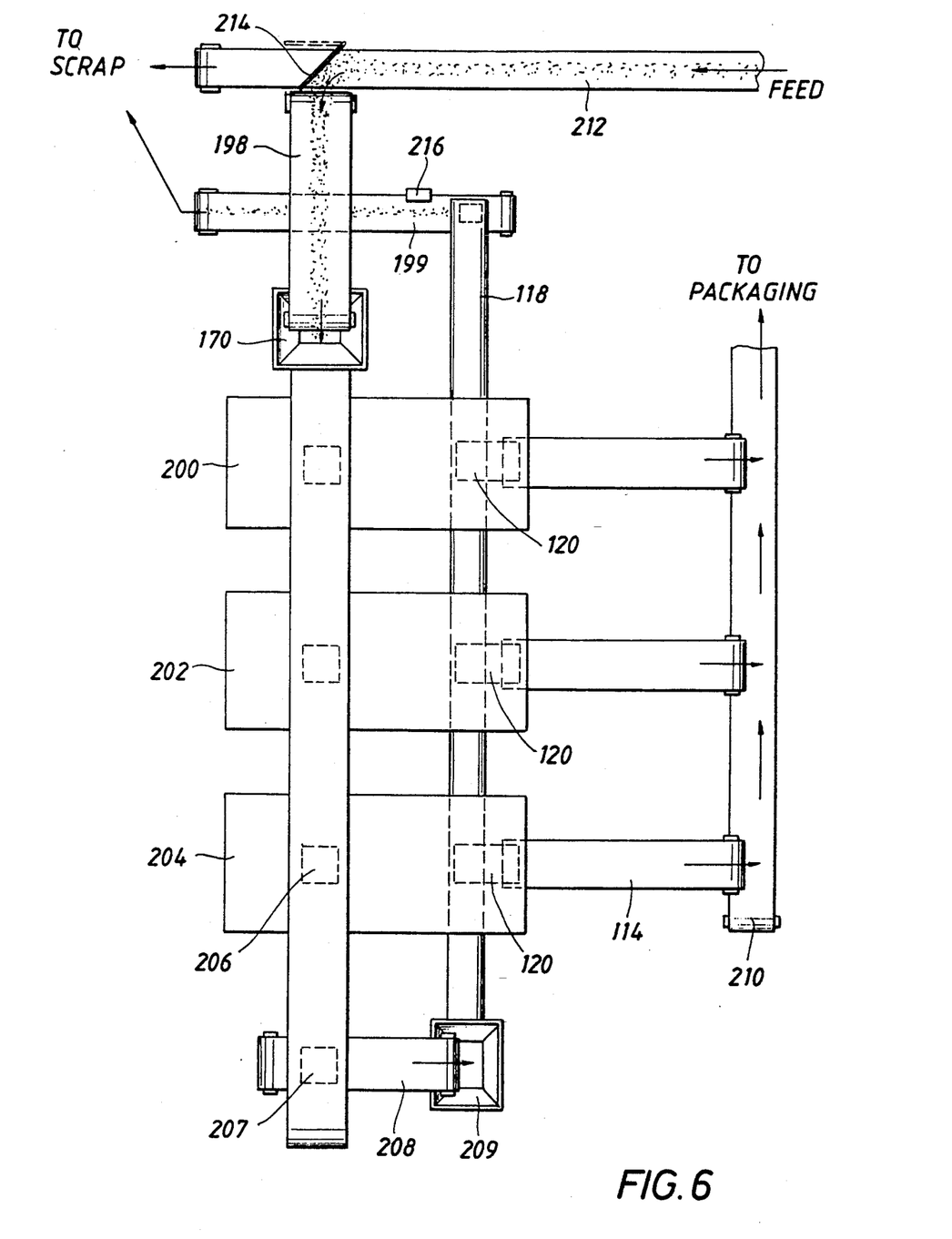
FIG. 6 is an upper elevational view of a system for processing rice bran in accord with the present invention.

FIG. 6 illustrates a preferred embodiment system for processing rice bran using three rice bran extruder units 200, 202, and 204. Rice bran 212 is fed to the system typically from a milling area. Rice is transported by conveyor 198 to hopper 170, or to the scrap heap to be mixed usually with animal feed, depending on the position of valve flap 214. The rice bran 212 is conveyed to the extruder units 200, 202, and 204 through hoppers, such as hopper 206 in extruder 204 in the manner shown generally in FIG. 5. The excess rice bran which goes through hopper 207 is returned to the scrap heap via conveyors 208, 118, and 199. The output rice bran from extruder units such as unit 204 goes through valve 120. Valve 120, controlled by computer 152, either sends the rice bran to packaging for human consumption over conveyor 210 or to the scrap heap via conveyor 118. Sensor 216 monitors rice bran going to the scrap heap. If the levels drop too low, this causes valve 214 to force more rice bran onto input conveyor 198. The converse is also true, too high a level, will cause valve 214 to send rice bran to the scrap heap thus regulating the flow of rice bran for processing.

It is thought that the rice bran extruder apparatus and system and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof. It is to be understood that while the specification is written in terms of rice bran, any bulk commodity including but not limited to corn, soybeans, wheat, animal fat waste products, fruit and vegetables, could be used with this invention.

What is claimed is:

1. An extruding apparatus for processing commodites such as rice bran, comprising:
   a cylindrical extrusion housing having first and second ends with a feed opening proximate said first end for introducing said rice bran;
   an annular housing mounted to said second end with a passageway therethrough axially aligned with said extrusion housing and flared outwardly along a first inclined surface;
   at least one knife mounted about the interior of said extrusion housing proximate said second end;
   an extrusion rotor disposed within said extrusion housing and said annular housing;
   means for rotating operatively connected to said extrusion rotor;
   spiral threading about the portion of said rotor disposed within said extrusion housing;
   at least one beater bar disposed about the portion of said rotor adjacent said knives, each said beater bar angularly oriented with respect to said threading, each said beater bar comprised of at least one segment, each said segment interposed between adjacent threads and wherein said segments and said knives are arrayed to produce during rotation of said rotor a plurality of impacts between at least one segment and at least one knife, each of said plurality of impacts separated by approximately equal degrees of rotation of said rotor;

a frustoconical section rotating with the portion of said rotor disposed within said housing and having a second inclined surface corresponding to said first inclined surface of said annular housing; and an extrusion gap formed between said inclined surfaces.

2. The extruding apparatus of claim 1 wherein said segments and said knives are arrayed to provide substantially continuous impacting of at least one said segment with at least one said knife during rotation of said rotor.

3. The extruding apparatus of claim 1 comprising a plurality of said segments symmetrically disposed about said rotor and a plurality of said knives symmetrically disposed about said interior of said extrusion housing, said segments and said knives arrayed to substantially balance said impacting during rotation of said rotor.

4. An extruding apparatus for processing commodities such as rice bran, comprising:

a cylindrical extrusion housing have first and second ends with a feed opening proximate said first end for introducing said rice bran;

an annular housing mounted to said second end with a passageway therethrough axially aligned with said extrusion housing and flared outwardly along a first inclined surface;

a plurality of knives symmetrically mounted about the interior of said extrusion housing proximate said second end;

an extrusion rotor disposed within said extrusion housing and said annular housing;

means for rotating said extrusion rotor with respect to said housing;

spiral threading about the portion of said rotor disposed within said extrusion housing;

a plurality of beater bars disposed symmetrically about the portion of said rotor adjacent said knives, said beater bars angularly oriented with respect to said threading, each said beater bar comprised of one or more segments, said segments being arranged in sets, said segments in each set including segments from a plurality of beater bars and being spaced symmetrically around said extrusion rotor in a manner corresponding to the spacing of said symmetrically mounted knives, said segments forming each said set being positioned to substantially simultaneously impact said knives having said corresponding spacing to said segments in said set during said rotation of said extrusion rotor;

a frustoconical section rotating with the portion of said rotor disposed within said housing and having a second inclined surface corresponding to said first inclined surface of said annular housing; and an extrusion gap formed between said inclined surfaces.

5. The extruding apparatus of claim 4 wherein the number of said knives and the number of said sets of segments have been selected so that at least one of said substantially simultaneous sets of impacts occurs during each 90 degrees of rotation of said rotor.

6. An extruding apparatus for processing commodities such as rice bran, comprising:

a cylindrical extrusion housing having first and second ends with a feed opening proximate said first end of introducing said rice bran;

an annular housing mounted to said second end with a passageway therethrough axially aligned with said extrusion housing and flared outwardly along a first inclined surface;

a plurality of knives symmetrically mounted about the interior of said extrusion housing proximate said second end;

an extrusion rotor disposed within said extrusion housing and said annular housing;

means for rotating said extrusion rotor with respect to said housing;

spiral threading about the portion of said rotor disposed within said extrusion housing;

a plurality of beater bars disposed symmetrically about a beater bar section of said rotor adjacent said knives, said beater bars angularly oriented with respect to said threading, each said beater bar comprised of at least one segment, each said segment interposed between adjacent threads;

a frustoconical section rotating with the portion of said rotor disposed within said housing and having a second inclined surface corresponding to said first inclined surface of said annular housing;

an extrusion gap formed between said inclined surfaces; and wherein at least one of said beater bar sections, said frustoconical section and said annular housing is comprised of a material which provides a heat sink for heat produced during extrusion of said rice bran.

7. The extruding apparatus of claim 6 wherein at least one of said beater bar section and said frustoconical section is substantially solid.

8. An extruding apparatus for processing commodities such as rice bran, comprising:

a cylindrical extrusion housing having first and second ends with a feed opening proximate said first end for introducing said rice bran;

an annular housing mounted to said second end with a passageway therethrough axially aligned with said extrusion housing and flared outwardly along a first inclined surface;

a plurality of knives mounted about the interior of said extrusion housing proximate said second end;

an extrusion rotor extending axially through said extrusion housing and said annular housing and rotatably fixed in said frame;

means for rotating operatively connected to said extrusion rotor;

spiral threading about the portion of said rotor disposed within said extrusion housing;

a plurality of beater bars disposed about the portion of said rotor adjacent said knives, said beater bars angularly oriented with respect to said threading, each said beater bar comprised of at least one segment, each said segment interposed between adjacent threads;

a frustoconical section rotating with the portion of said rotor disposed within said housing and having a second inclined surface corresponding to said first inclined surface of said annular housing; and an extrusion gap formed between said inclined surfaces, and having a length along said inclined surface at least about 1.85 inches.

9. An extruding apparatus for processing commodities such as rice bran, comprising:
a cylindrical extrusion housing having first and second ends with a feed opening proximate said first end for introducing said rice bran;
an annular housing mounted to said second end with a passageway therethrough axially aligned with said extrusion housing and flared outwardly along a first inclined surface;
a plurality of knives symmetrically mounted about the interior of said extrusion housing proximate said second end;
an extrusion rotor disposed within said extrusion housing and said annular housing;
means for rotating operatively connected to said extrusion rotor;
spiral threading about the portion of said rotor disposed within said extrusion housing;
a plurality of beater bars disposed symmetrically about the portion of said rotor adjacent said knives, said beater bars angularly oriented with respect to said threading, each said beater bar comprised of at least one segment, each said segment interposed between adjacent threads and wherein the number of said knives and the number of said bars have been selected so that one number is evenly divisible by the other without remainder;
a frustoconical section rotating with the portion of said rotor disposed within said housing and having a second inclined surface corresponding to said first inclined surface of said annular housing; and
an extrusion gap formed between said inclined surfaces.

10. The extruding apparatus of claim 9 wherein the number of said bars is equal to the number of said knives.

11. The extruding apparatus of claim 9 wherein at least one of said beater bars is comprised of a plurality of said segments linearly disposed between alternate pairs of adjacent threads.

12. The extruding apparatus of claim 9 further including a frame in which said extrusion housing is mounted, and wherein said rotor extends axially through said ends of said extrusion housing and said frustoconical section and is rotatably fixed in said frame.

13. The extruding apparatus of claim 9 wherein said rotor comprises at least two separable portions with one said portion including said beater bars.

14. The extruding apparatus of claim 9 wherein said beater bars and knives are constructed of wear resistant materials.

15. The extruding apparatus of claim 9 wherein said beater bars are more resistant to wear than are said knives.

16. The extruding apparatus of claim 15 wherein said knives are replaceable.

17. The extruding apparatus of claim 16 wherein said knives are disposed substantially parallel to the axis of said cylindrical housing.

18. The extruding apparatus of claim 9 wherein each said bar is disposed along a line within an arc around said rotor and wherein the number of degrees around said rotor in each said arc is about 360 divided by the number of said bars or said knives.

19. The extruding apparatus of claim 18 wherein each said bar formed of said segments extends around said rotor substantially through said number of degrees in each said arc.

20. The extruding apparatus of claim 19 including three said knives and three said bars, each said bar comprising at least four said segments.

21. The extruding apparatus of claim 9 wherein said inclined surfaces are substantially parallel.

22. The extruding apparatus of claim 9 wherein the length of said extrusion gap along said inclined surfaces is at least about 1.85 inches.

23. The extruding apparatus of claim 22 wherein said extrusion gap has an axial length component parallel to the axis of said rotor at least about 1.5 inches.

24. The extruding apparatus of claim 9 wherein at least one of said frustoconical section and said annular housing are comprised of a material which provides a heat sink for heat produced during extrusion of said rice bran.

25. The extruding apparatus of claim 9 wherein the width of said extrusion gap is adjustable, and further comprising:
a temperature sensor for measuring the processing temperature of said rice bran; and
a feedback loop for adjusting said width of said extrusion gap in response to said measured temperature to maintain a desired processing temperature.

26. The extruding apparatus of claim 25, further including:
an output valve for discharged rice bran which emerges from said extrusion gap, said output valve operable responsive to said temperature sensor between first and second positions, said first position of said output valve for routing rice bran extruded within said desired processing temperature and said second position for routing rice bran extruded outside said desired processing temperature.

27. The extruding apparatus of claim 26, further including:
an input conveyor system for bringing rice bran to said feed opening in said extrusion housing;
a first conveyor system for transporting to a scrap heap unprocessed rice bran which did not enter said feed opening from said input conveyor system and improperly processed rice bran from said output valve;
a sensor to determine the amount of rice bran on said output conveyor system; and
a feedback loop from said sensor to said input conveyor system and said output valve to control the amount of rice bran on said input conveyor system.

* * * * *